(12) United States Patent
Noh et al.

(10) Patent No.: US 9,865,874 B2
(45) Date of Patent: Jan. 9, 2018

(54) APPARATUS FOR PREPARING INORGANIC COMPOUND AND METHOD OF PREPARING INORGANIC COMPOUND USING THE SAME

(71) Applicant: LG Chem, Ltd., Seoul (KR)

(72) Inventors: Hyun Kuk Noh, Daejeon (KR); Ji Hoon Ryu, Daejeon (KR); Wang Mo Jung, Daejeon (KR); Hong Kyu Park, Daejeon (KR); Sang Seung Oh, Daejeon (KR); Chi Ho Jo, Daejeon (KR)

(73) Assignee: LG Chem, Ltd. (KR)

( * ) Notice: Subject to any disclaimer, the term of this patent is extended or adjusted under 35 U.S.C. 154(b) by 89 days.

(21) Appl. No.: 14/432,350

(22) PCT Filed: Nov. 27, 2013

(86) PCT No.: PCT/KR2013/010821
§ 371 (c)(1),
(2) Date: Mar. 30, 2015

(87) PCT Pub. No.: WO2014/084584
PCT Pub. Date: Jun. 5, 2014

(65) Prior Publication Data
US 2015/0270549 A1    Sep. 24, 2015

(30) Foreign Application Priority Data
Nov. 27, 2012    (KR) .................. 10-2012-0134980

(51) Int. Cl.
*B01J 3/02*        (2006.01)
*B01J 4/00*        (2006.01)
(Continued)

(52) U.S. Cl.
CPC ........... *H01M 4/5825* (2013.01); *B01J 3/008* (2013.01); *B01J 3/02* (2013.01); *B01J 4/002* (2013.01);
(Continued)

(58) Field of Classification Search
CPC ....... B01J 3/00; B01J 3/008; B01J 3/02; B01J 4/00–4/002; B01J 19/00; B01J 19/02;
(Continued)

(56) References Cited

U.S. PATENT DOCUMENTS

2007/0020171 A1* 1/2007 Waki .................. B01J 3/008
423/599
2007/0206435 A1    9/2007 Lester et al.
(Continued)

FOREIGN PATENT DOCUMENTS

JP    2002102672 A    4/2002
JP    2003340262 A    12/2003
(Continued)

OTHER PUBLICATIONS

International Search Report for Application No. PCT/KR2013/010821 dated Jan. 10, 2014.

*Primary Examiner* — Natasha Young
(74) *Attorney, Agent, or Firm* — Lerner, David, Littenberg, Krumholz & Mentlik, LLP

(57) ABSTRACT

Disclosed is a hydrothermal synthesis device for continuously preparing an inorganic slurry using a hydrothermal method. The hydrothermal synthesis device includes a mixer to mix at least one precursor solution for preparing an inorganic material, injected via at least one supply tube, to prepare an intermediate slurry, a connection tube provided at a side of the mixer, continuously discharging the prepared intermediate slurry to a reactor, and having an inner surface contacting a precursor solution mixture on which abrasive (Continued)

polishing has been performed, and the reactor performing hydrothermal reaction of the intermediate slurry supplied from the connection tube by receiving a liquid stream heated to supercritical or subcritical conditions using a heat exchanger and connected to the connection tube into which the intermediate slurry prepared from the mixer is introduced and to at least one injection tube into which the heated liquid stream is injected.

14 Claims, 4 Drawing Sheets

(51) Int. Cl.

| | | |
|---|---|---|
| *B01J 19/00* | (2006.01) | |
| *B01J 19/02* | (2006.01) | |
| *B01J 19/24* | (2006.01) | |
| *H01M 4/36* | (2006.01) | |
| *H01M 4/485* | (2010.01) | |
| *H01M 4/58* | (2010.01) | |
| *H01M 10/05* | (2010.01) | |
| *H01M 10/052* | (2010.01) | |
| *H01M 10/0525* | (2010.01) | |
| *B01J 3/00* | (2006.01) | |
| *H01M 4/00* | (2006.01) | |
| *H01M 4/02* | (2006.01) | |
| *H01M 4/48* | (2010.01) | |
| *H01M 10/00* | (2006.01) | |

(52) U.S. Cl.
CPC ............... *B01J 19/02* (2013.01); *B01J 19/24* (2013.01); *H01M 4/485* (2013.01); *H01M 10/0525* (2013.01); *B01J 2204/007* (2013.01); *B01J 2219/00094* (2013.01); *B01J 2219/00247* (2013.01); *B01J 2219/02* (2013.01); *B01J 2219/0209* (2013.01); *B01J 2219/0236* (2013.01); *B01J 2219/0286* (2013.01); *B01J 2219/24* (2013.01); *H01M 2004/028* (2013.01); *Y02P 20/544* (2015.11)

(58) Field of Classification Search
CPC .. B01J 19/24; B01J 2204/00; B01J 2204/007; B01J 2219/00049; B01J 2219/00051; B01J 2219/00074; B01J 2219/00087; B01J 2219/0009; B01J 2219/00094; B01J 2219/00245; B01J 2219/00248; B01J 2219/02; B01J 2219/0204; B01J 2219/0209; B01J 2219/025; B01J 2219/0236; B01J 2219/0277; B01J 2219/0286; B01J 2219/24; Y02P 20/00; Y02P 20/50; Y02P 20/54; Y02P 20/544
See application file for complete search history.

(56) References Cited

U.S. PATENT DOCUMENTS

| | | | |
|---|---|---|---|
| 2010/0270296 A1* | 10/2010 | Rauleder | ............... B65D 88/12 220/1.5 |
| 2013/0029226 A1 | 1/2013 | Noh et al. | |
| 2013/0129596 A1 | 5/2013 | Noh et al. | |
| 2015/0280214 A1* | 10/2015 | Noh | ................. B01J 19/02 252/182.1 |

FOREIGN PATENT DOCUMENTS

| | | | |
|---|---|---|---|
| JP | 2010168253 | A | 8/2010 |
| KR | 20070001999 | A | 1/2007 |
| KR | 20110117629 | A | 10/2011 |
| KR | 20120015278 | A | 2/2012 |
| WO | WO 2012/020986 | A2 * | 2/2012 |

* cited by examiner

[FIG.1]
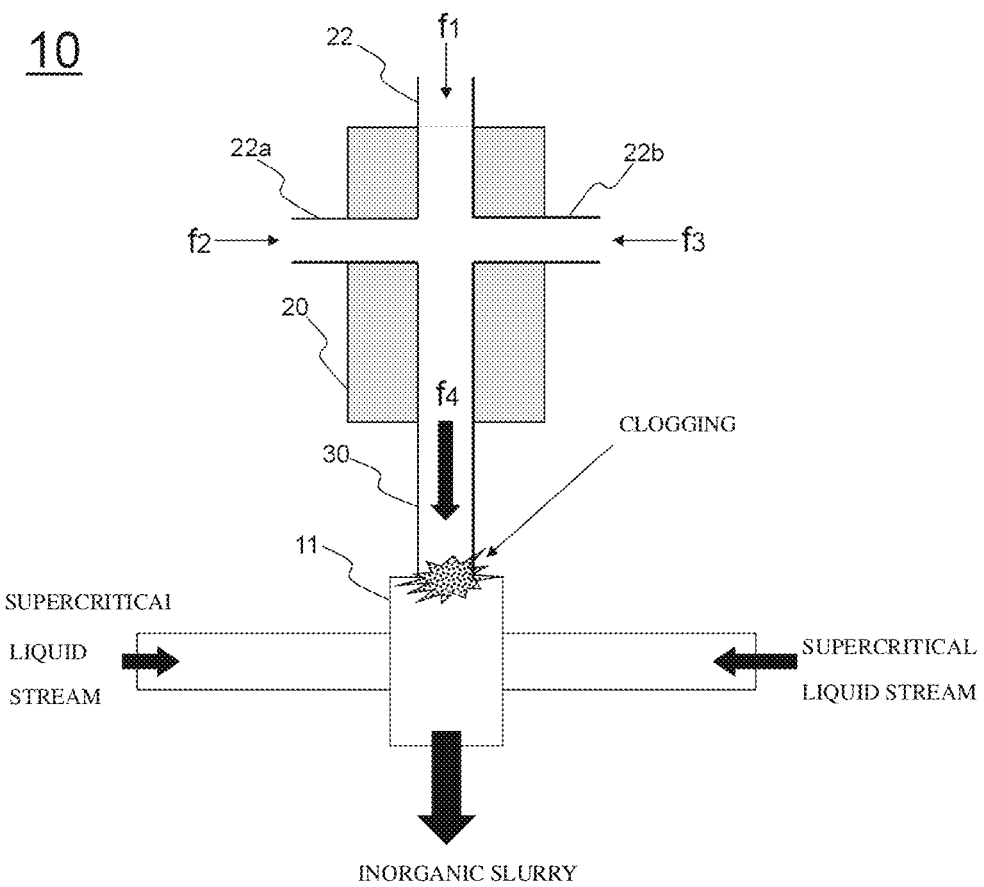

[FIG. 2]
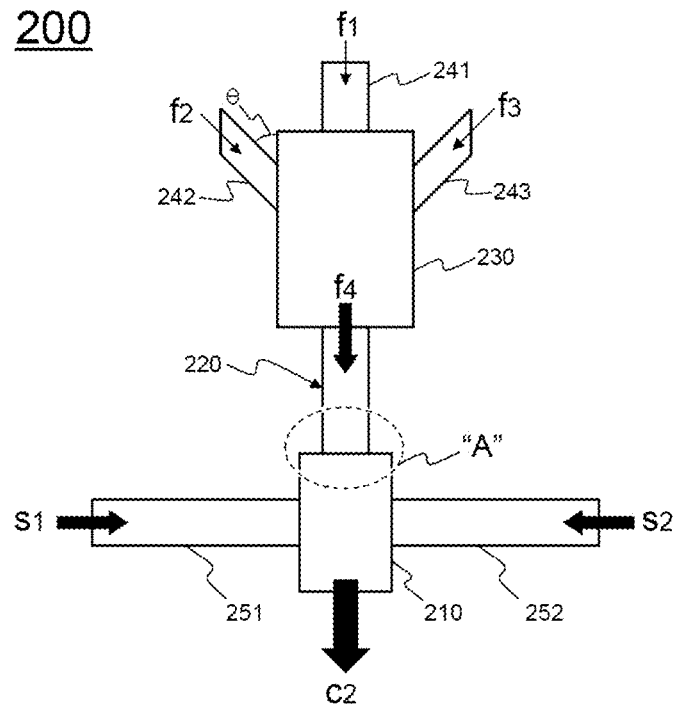
[FIG. 3]
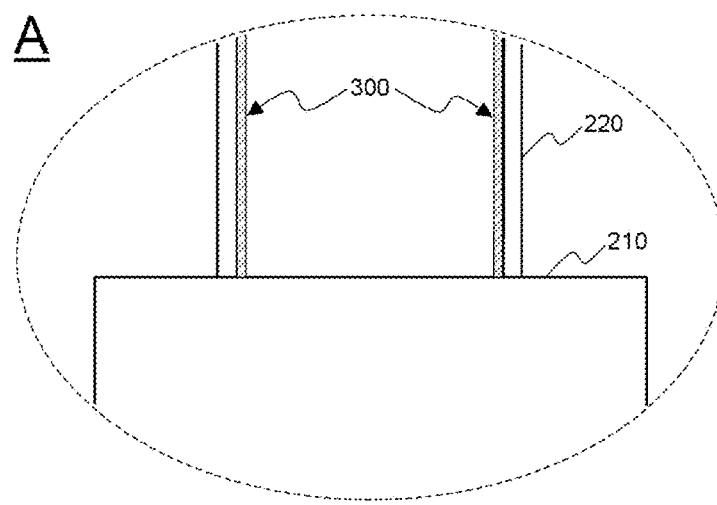

[FIG. 4]
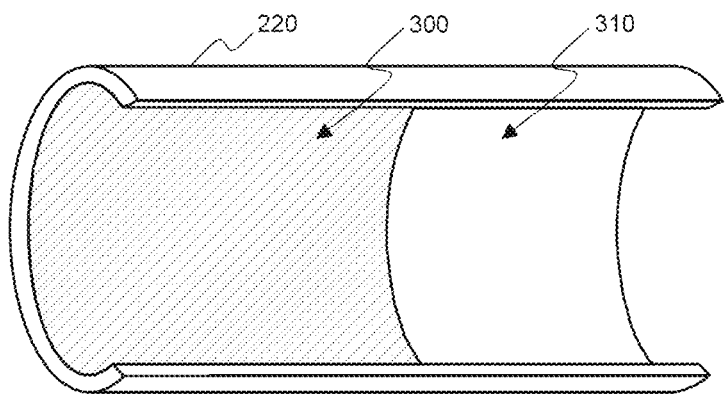
[FIG. 5]
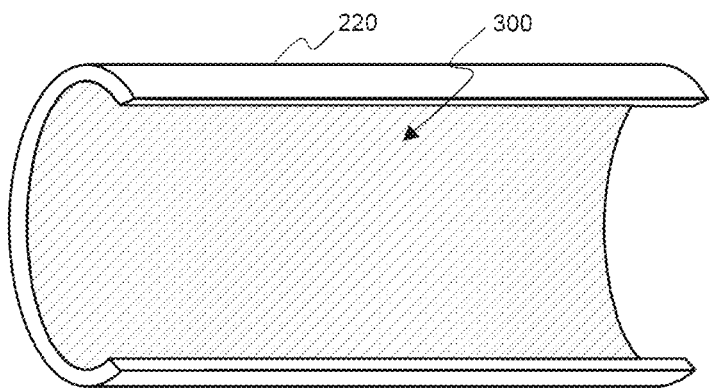

[FIG. 6]
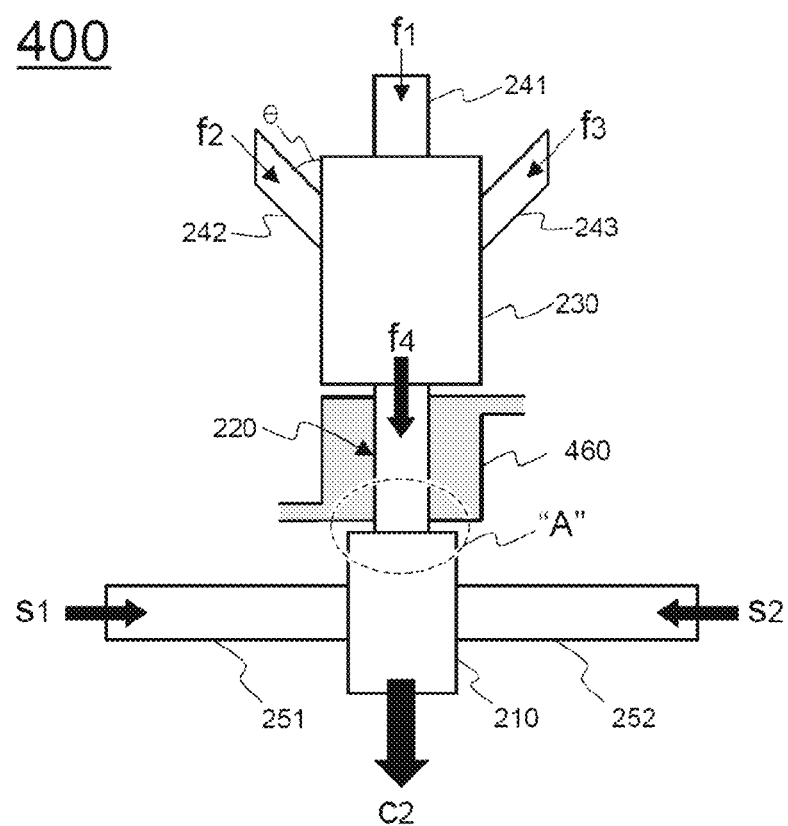

APPARATUS FOR PREPARING INORGANIC COMPOUND AND METHOD OF PREPARING INORGANIC COMPOUND USING THE SAME

This application is a national phase entry under 35 U.S.C. §371 of International Application No. PCT/KR2013/010821, now WO 2014/084584, filed Nov. 27, 2013, which claims priority to Korean Patent Application No. 10-2012-0134980, filed on Nov. 27, 2012, the disclosures of which are incorporated herein by reference.

TECHNICAL FIELD

The present invention relates to an apparatus for preparing an inorganic compound and a method of preparing an inorganic compound using the same. More particularly, the present invention relates to a hydrothermal synthesis device for continuously preparing an inorganic slurry using a hydrothermal method, including: a mixer to mix at least one precursor solution for preparing an inorganic material, injected via at least one supply tube, to prepare an intermediate slurry; a connection tube provided at a side of the mixer, continuously discharging the prepared intermediate slurry to a reactor, and having an inner surface contacting a precursor solution mixture abrasively polished; and the reactor performing hydrothermal reaction of the intermediate slurry supplied from the connection tube by receiving a liquid stream heated to supercritical or subcritical conditions using a heat exchanger and connected to the connection tube into which the intermediate slurry prepared from the mixer is introduced and to at least one injection tube into which the heated liquid stream is injected.

BACKGROUND ART

Inorganic compounds are used as raw materials or final products in various fields and also used as raw materials of electrode active materials for secondary batteries, which have recently been increasingly used.

Lithium secondary batteries, which are a representative example of secondary batteries, generally use lithium cobalt oxide ($LiCoO_2$) as a cathode active material, a carbon material as an anode active material, and lithium hexafluorophosphate (($LiPF_6$) as an electrolyte. As the cathode active materials, layered $LiCoO_2$, lithium nickel oxide ($LiNiO_2$), spinel lithium manganese oxide ($LiMn_2O_4$), and the like are known, but $LiCoO_2$ is the most commonly used in commercial applications.

However, supply of cobalt as a main component is unstable and cobalt is expensive and thus materials, some cobalt atoms of which are substituted with another transition metal such as Ni, Mn, or the like, or spinel $LiMn_2O_4$ and the like which contain very little cobalt have begun to be commercially used. In addition, novel compounds with more stable structure even at high voltage or materials that are prepared by doping or coating existing cathode active materials with other metal oxides and thus have enhanced stability have been developed.

Among conventional methods of preparing cathode active materials, dry calcination and wet precipitation are mostly widely known methods. According to dry calcination, a cathode active material is prepared by mixing an oxide or hydroxide of a transition metal such as cobalt (Co) or the like with lithium carbonate or lithium hydroxide as a lithium source in a dried state and then calcining the resulting mixture at a high temperature of 700° C. to 1000° C. for 5 to 48 hours.

Dry calcination is, advantageously, a widely used technology for preparing metal oxides and thus is easy to approach, but is disadvantageous in that it is difficult to obtain single-phase products due to difficulties in uniform mixing of raw materials and, in the case of multi-component cathode active materials consisting of two or more transition metals, it is difficult to homogeneously arrange at least two elements to atom levels. In addition, when a method of doping or substituting with particular metal components to improve electrochemical performance is used, it is difficult to uniformly mix the particular metal components added in small amounts and loss of the metal components inevitably occurs through pulverizing and sorting processes performed to obtain desired particle sizes.

Another conventional method of preparing cathode active materials is wet precipitation. In wet precipitation, a cathode active material is prepared by dissolving a salt containing a transition metal such as Co or the like in water, adding alkali to the solution to precipitate the transition metal in the form of transition metal hydroxide, filtering and drying the precipitate, mixing the resulting precipitate with lithium carbonate or lithium hydroxide as a lithium source in a dried state, and calcining the mixture at a high temperature of 700° C. to 1000° C. for 1 to 48 hours.

The wet precipitation method is known to easily obtain a uniform mixture by co-precipitating, in particular, two or more transition metal elements, but requires a long period of time in precipitation reaction, is complicated, and incurs generation of waste acids as by-products. In addition, various methods, such as a sol-gel method, a hydrothermal method, spray pyrolysis, an ion exchange method, and the like, have been used to prepare a cathode active material for lithium secondary batteries.

In addition to the methods described above, a method of preparing an inorganic compound for a cathode active material by hydrothermal synthesis using high-temperature and high-pressure water is used.

With regards to this, referring to FIG. 1, in a conventional hydrothermal synthesis device 10, precursor solutions f1, f2 and f3 are respectively supplied from upper and side parts of a mixer 20 via supply tubes 22, 22a and 22b, the supplied precursor solutions are mixed to prepare an intermediate slurry f4 and then the intermediate slurry f4 is supplied to a reactor 11 via a connection tube 30 connected to the reactor 11, and, while supercritical liquid streams containing high-temperature and high-pressure water are injected from opposite sides of the reactor 11, reaction between the intermediate slurry f1 and the supercritical liquid streams occurs in the reactor 11 for a short period of time.

In this regard, the intermediate slurry f4 supplied to the reactor 11 has increased shearing stress over time due to the viscosity of the intermediate slurry f4 and friction on an inner surface of the connection tube 30 and thus does not smoothly move, which results in accumulation of the intermediate slurry f4 on the inner surface thereof. In addition, reaction of the intermediate slurry f4 accumulated at an entrance portion of the reactor 11 occurs, thus causing clogging of the entrance portion thereof.

Consequently, a continuous operating time of a hydrothermal synthesis device is dramatically reduced, much labor and time are required for disassembly and internal cleaning of the clogged reactor, which results in significantly reduced manufacturing productivity, and investment costs are increased.

Therefore, there is a high need to develop a technology that may fundamentally address these problems.

DISCLOSURE

Technical Problem

Therefore, the present invention has been made to solve the above problems and other technical problems that have yet to be resolved.

As a result of a variety of intensive studies and various experiments, the inventors of the present invention confirmed that, in an apparatus for continuously preparing an inorganic slurry using a hydrothermal method, when an inner surface of a connection tube through which a precursor solution mixture is discharged to a reactor is abrasively polished, clogging of an inlet through the precursor solution mixture is introduced may be minimized or completely prevented.

Therefore, it is an object of the present invention to provide a hydrothermal synthesis device for preparing an inorganic compound that has significantly increased productivity and reduced investment costs by extending a continuous driving time in a process of preparing an inorganic compound using the hydrothermal synthesis device.

Technical Solution

In accordance with one aspect of the present invention, provided is a hydrothermal synthesis device for continuously preparing an inorganic slurry using a hydrothermal method, including:

a mixer to mix at least one precursor solution for preparing an inorganic material, injected via at least one supply tube, to prepare an intermediate slurry;

a connection tube provided at a side of the mixer, continuously discharging the prepared intermediate slurry to a reactor, and having an inner surface contacting a precursor solution mixture abrasively polished; and the reactor performing hydrothermal reaction of the intermediate slurry supplied from the connection tube by receiving a liquid stream heated to supercritical or subcritical conditions using a heat exchanger and connected to the connection tube into which the intermediate slurry prepared from the mixer is introduced and to at least one injection tube into which the heated liquid stream is injected.

Thus, in the hydrothermal synthesis device, the inner surface of the connection tube through which the intermediate slurry prepared through mixing of the at least one precursor solution is discharged to the reactor is abrasively polished and thus clogging occurring at an inlet through which the intermediate slurry is introduced may be minimized to extend a continuous driving time, which results in significantly increased manufacturing productivity.

In one specific embodiment, the supply tubes may include a first supply tube disposed at a central portion of an upper surface of the mixer, a second supply tube disposed at a side part of the mixer so as to form an internal angle of 10° to 90° with respect to the first supply tube, and a third supply tube disposed at another side of the mixer so as to face the second supply tube.

In particular, the respective supply tubes may supply inorganic precursor solutions having different components, a supply rate of the precursor solutions may be accelerated by forming an internal angle between the second and third supply tubes, and an intermediate slurry in which at least two precursor solutions are mixed may be smoothly supplied by adjusting a mix rate of the precursor solutions supplied via the second and third supply tubes with the precursor solution supplied via the first supply tube by fluid flow.

In addition, the mixer may be further provided inside thereof with a static or stirring-type stirring member that may enable uniform mixing of precursor solutions and increase in mixing efficiency in consideration of the amount of precursor solutions supplied into the mixer and the size of the hydrothermal synthesis device.

Meanwhile, the connection tube may be made of, for example, an austenite-based stainless steel material. More particularly, the austenite-based stainless steel material may be selected from the group consisting of STAINLESS STEEL 304, STAINLESS STEEL 316, STAINLESS STEEL 304L, and STAINLESS STEEL 316L.

In general, stainless steel is an alloy steel made by adding a considerable amount of chromium (Cr) to iron (Fe) so as not to easily rust and, as desired, an alloy steel containing small amounts of complex components such as carbon (C), nickel (Ni), silicon (Si), manganese (Mn), molybdenum (Mo), and the like.

These stainless steel materials contain Fe as a main component and have several properties that general steel does not have, i.e., corrosion resistance, heat resistance, and the like. In particular, STAINLESS STEEL 304, STAINLESS STEEL 316, STAINLESS STEEL 304L, and STAINLESS STEEL 316L, which are austenite-based stainless steel materials, may be used as a material for the connection tube constituting the hydrothermal synthesis device according to the present invention due to excellent welding properties and high-temperature strength and no magnetic properties, as well as high corrosion resistance and heat resistance.

Meanwhile, abrasive polishing performed on the inner surface of the connection tube contacting the intermediate slurry, through which the intermediate slurry is discharged to the reactor, may be performed by, for example, at least one selected from the group consisting of mechanical polishing, chemical polishing, chemical mechanical polishing, and electropolishing. More particularly, abrasive polishing may be performed by electropolishing.

In general, electropolishing is a method in which, by applying a voltage between an anode formed of a metal product soluble in an electropolishing solution and a cathode formed of a metal that is not soluble in the electropolishing solution, electrolysis occurs at a surface of the metal product and, consequently, the surface of the metal product is polished.

To polish a metal product by electropolishing, an electrolytic bath is filled with an electropolishing solution, a metal product to be polished is installed as an anode, a cathode that is not soluble in the electropolishing solution is installed, and direct current power is applied between the anode and the cathode. In electropolishing, when current is supplied even under conditions under which metal products are not readily soluble in an electropolishing solution, a metal product is forcedly dissolved little by little. When electropolishing progresses, a high-viscosity liquid layer (a viscous layer) containing a large amount of metal ions dissolved from the anode surrounds the anode.

In the viscous layer saturated with metal ions, metal is not dissolved any longer and high anode potential is formed, and thus, the viscous layer vigorously binds oxygen, thereby forming an oxide film. In this regard, the dissolved metal ions are mainly accumulated in a concave portion of the surface of the metal, and there is little movement and diffusion of metal ions in the concave portion and thus the concave portion has no current flow and, accordingly, the metal is not dissolved therein. On the other hand, in a convex portion of the surface of the metal, a thin metal ion layer is formed and thus current is concentrated and, accordingly, the surface of the metal is easily dissolved, which results in an overall smooth surface of the metal product.

In one specific embodiment, electropolishing may be performed by a process including: pre-treatment including acid treatment and water cleaning of an inner surface of the connection tube; electropolishing of the inner surface of the connection tube; and post-treatment including neutralization of an electropolishing solution and water cleaning. More particularly, the electropolishing solution used in electropolishing may contain sulfuric acid and phosphoric acid when considering that the connection tube is made of a stainless steel material.

The other abrasive polishing methods such as mechanical polishing, chemical polishing and chemical mechanical polishing in addition to electropolishing are known in the art and thus a detailed description thereof will be omitted herein.

In the hydrothermal synthesis device according to the present invention, the abrasive polishing may be selectively performed on an inner surface of a portion of the connection tube in the vicinity of an inlet of the reactor, but embodiments of the present invention are not limited thereto. That is, the inner surface of the connection tube may be completely abrasively polished.

In a conventional hydrothermal synthesis device, as described above, a relatively large amount of a liquid stream heated to supercritical or subcritical conditions in an inorganic slurry stream is required to suppress clogging of a connection tube.

On the other hand, according to the present invention, such problems may be addressed through abrasive polishing, and thus, the amount of an inorganic material of the inorganic slurry may be 0.05 wt % to 5 wt %.

In addition to the above-described abrasive polishing of the inner surface of the connection tube, the hydrothermal synthesis device may have a structure in which a hydrophobic coating is formed on an inner surface of at least one of the mixer, the reactor, and the injection tube of the hydrothermal synthesis device, to protect elements of the device in terms of characteristics of the hydrothermal method operating at high temperature and high pressure and to complement properties of materials constituting the elements.

In some embodiments, a cooling member to dissipate heat transferred from the heated liquid stream may further be installed at an outer portion of the connection tube.

Conditions such as flow rate and the like for optimizing hydrothermal synthesis in the hydrothermal synthesis device of the present invention may vary according to various manufacturing conditions such as a precursor, an inorganic material, a production rate, and the like.

In one specific embodiment, the liquid stream may, for example, be supercritical water heated under conditions of a temperature of 350° C. to 800° C. and a pressure of 180 bar to 550 bar, and the injection tube through which the heated liquid stream is injected may include two injection tubes provided at outer sides of the reactor. However, inlet position angles and the like of the injection tubes may each independently be freely selected and, in particular, the injection tubes may be two injection tubes disposed at outer surfaces of the reactor. More particularly, the injection tubes may be positioned so as to form an angle of 30° to 150°, in particular 45° to 135°, with respect to a discharge direction of an inorganic slurry prepared according to desired reaction atmosphere.

The present invention also provides a method of preparing an inorganic slurry by using the hydrothermal synthesis device, including:

injecting, into a mixer, a first precursor solution for preparation of an inorganic material via a first supply tube and a second precursor solution for preparation of an inorganic material via each of second and third supply tubes;

injecting, into a reactor, an intermediate slurry prepared through mixing of the injected first and second precursor solutions via a connection tube;

injecting supercritical water containing high-temperature and high-pressure water into the reactor via an injection tube; and preparing an inorganic slurry by hydrothermal reaction in the reactor and continuously discharging the prepared inorganic slurry therefrom.

Type of an inorganic material obtained from the inorganic slurry prepared using the method described above is not particularly limited. For example, the inorganic material as a cathode active material may be at least one selected from the group consisting of $Co_2O_3$, $Fe_2O_3$, $LiMn_2O_4$, $MO_x$ where M is Fe, Ni, Co, Mn, Al, or the like and x is a number providing electroneutrality, MOOH where M is Fe, Ni, Co, Mn, Al, or the like, and $A_aM_mX_xO_oS_sN_nF_f$ where A is at least one selected from the group consisting of Li, Na, K, Rb, Cs, Be, Mg, Ca, Sr, and Ba; M may contain at least one transition metal and optionally contain at least one selected from the group consisting of B, Al, Ga, and In; X is at least one selected from the group consisting of P, As, Si, Ge, Se, Te, and C; O is oxygen; S is sulfur; N is nitrogen; F is fluorine; and a, m, x, o, s, n, and f are each independently a number of 0 or more, providing electroneutrality.

In a specific embodiment, the inorganic material as a cathode active material may be $Li_aM_bM'_cPO_4$ where M is at least one selected from the group consisting of Fe, Ni, Co, and Mn; M' is at least one selected from the group consisting of Ca, Ti, S, C, and Mg; and a, b, and c are each independently a number of 0 or more, providing electroneutrality, in particular an olivine-structure $LiFePO_4$.

Secondary batteries using the inorganic material as a cathode active material are known in the art and thus a detailed description thereof will be omitted herein.

BRIEF DESCRIPTION OF THE DRAWINGS

The above and other objects, features and other advantages of the present invention will be more clearly understood from the following detailed description taken in conjunction with the accompanying drawing, in which:

FIG. 1 is a schematic view of a conventional hydrothermal synthesis device;

FIG. 2 is a schematic view of a hydrothermal synthesis device according to an embodiment of the present invention;

FIG. 3 is an enlarged view of portion "A" of FIG. 2;

FIGS. 4 and 5 are views illustrating an interior appearance of a connection tube of FIG. 2; and FIG. 6 is a view of a hydrothermal synthesis device including a connection tube provided with a cooling member according to another embodiment of the present invention.

BEST MODE

Now, the present invention will be described in more detail with reference to the following examples. These examples are provided only for illustration of the present invention and should not be construed as limiting the scope and spirit of the present invention.

FIG. 2 is a schematic view of a hydrothermal synthesis device 200 according to an embodiment of the present invention.

Referring to FIG. 2, precursor solutions f1, f2 and f3 for preparation of an inorganic material are respectively injected into a mixer 230 via first, second and third supply tubes 241, 242 and 243. In the mixer 230, the first supply tube 241 is positioned at a central portion of an upper surface of the mixer 230, the second supply tube 242 is positioned at a side part of the mixer 230 so as to form a predetermined internal angle with respect to the first supply tube 241, and the third supply tube 243 is positioned at another side of the mixer 230 so as to face the second supply tube 242. The internal angle may be appropriately adjusted within 10° to 90° with respect to the first supply tube 241 according to desired reaction atmosphere.

In addition, the supplied precursor solutions f1, f2 and f3 are naturally mixed inside the mixer 230 by fluid flow to prepare an intermediate slurry f4. Thus, such structure is suitable for supply and mixing of different precursor solutions (e.g., precursor solutions f1, f2 and f3), and the second and third supply tubes 242 and 243 form inclined surfaces with respect to the first supply tube 241 and thus mixing amounts of the precursor solutions f1, f2 and f3 according to movement rates may be adjusted.

The intermediate slurry f4 prepared in the mixer 230 is introduced into a reactor 210 via a connection tube 220 and contacts liquid streams s1 and s2 heated to supercritical or subcritical conditions, whereby reaction therebetween occurs, and the reaction product in the form of an inorganic slurry c2 is discharged therefrom. The liquid streams s1 and s2 are injected into the reactor 210 via two injection tubes 251 and 252 positioned at outer sides of the reactor 210. In some embodiments, the connection tube 220 may be provided at an outer portion thereof with a cooling member (not shown) to dissipate heat transferred from the heated liquid streams s1 and s2.

An inner surface of the connection tube 220 through which the intermediate slurry f4 is introduced into the reactor 210 may have an abrasively polished portion so as to prevent occurrence of clogging of a portion (e.g., portion A of FIG. 2) of the connection tube 220 adjacent to an inlet of the reactor 210.

FIG. 3 is an enlarged view of the portion A of FIG. 2 adjacent to the inlet of the reactor 210.

Referring to FIG. 3, an inner surface of the connection tube 220 contacting the intermediate slurry f4 has an abrasively polished portion 300 so that, when the intermediate slurry f4 prepared through mixing of precursor solutions in the mixer 230 is introduced into the reactor 210 via the connection tube 220, occurrence of clogging at the portion A of the connection tube 220 adjacent to the inlet of the reactor 210 due to rapid synthesis reaction is prevented.

FIGS. 4 and 5 are views illustrating an interior appearance of the connection tube 220 of FIG. 2.

Referring to FIGS. 4 and 5, the abrasively polished portion 300 of the inner surface of the connection tube 220 may be selectively formed in the vicinity of the inlet of the reactor 210 in which clogging frequently occurs or the entire inner surface of the connection tube 220 may have the abrasively polished portion 300.

FIG. 6 is a view of a hydrothermal synthesis device 400 including the connection tube 220 provided with a cooling member 460 according to another embodiment of the present invention.

Referring to FIG. 6, the cooling member 460 made of a metal tube or a heat sink contacting a refrigerant having a temperature of about 10° C. is positioned at an outer portion of the connection tube 220. The cooling member 460 suppresses deposition and early reaction by rapidly dissipating heat transferred from a supercritical liquid stream and, accordingly, abrasive polishing effects may be maximized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, in a hydrothermal synthesis device according to the present invention, an inner surface of a connection tube through which an intermediate slurry prepared through mixing of at least one precursor solution is introduced into a reactor is abrasively polished and thus clogging of an inlet through which a precursor solution mixture is introduced may be minimized or completely prevented. In addition, in a method of preparing an inorganic compound using the hydrothermal synthesis device, a continuous operating time may be extended and thus productivity may be significantly increased and investment costs may be reduced.

The invention claimed is:

1. A hydrothermal synthesis device for continuously preparing an inorganic slurry using a hydrothermal method, the hydrothermal synthesis device comprising:
   a mixer to mix at least one precursor solution for preparing an inorganic material, injected via at least one supply tube, to prepare an intermediate slurry;
   a connection tube provided at a side of the mixer, continuously discharging the prepared intermediate slurry via the connection tube to a reactor, and having an inner surface contacting a precursor solution mixture on which abrasive polishing has been performed; and
   the reactor performing hydrothermal reaction of the intermediate slurry supplied from the connection tube by receiving a liquid stream heated to supercritical or subcritical conditions using a heat exchanger and connected to the connection tube into which the intermediate slurry prepared from the mixer is introduced and to at least one injection tube into which the heated liquid stream is injected; and
   wherein the connection tube is provided at an outer portion thereof with a cooling member to dissipate heat transferred from the heated liquid stream in order to maximize the effects of the abrasive polishing with respect to the prevention of clogging in the connection tube.

2. The hydrothermal synthesis device according to claim 1, wherein the supply tube comprises a first supply tube disposed at a central portion of an upper surface of the mixer, a second supply tube disposed at a side part of the mixer so as to form an internal angle of 10° to 90° with respect to the first supply tube, and a third supply tube disposed at another side of the mixer so as to face the second supply tube.

3. The hydrothermal synthesis device according to claim 1, wherein the connection tube comprises an austenite-based stainless steel material.

4. The hydrothermal synthesis device according to claim 3, wherein the austenite-based stainless steel material is selected from STAINLESS STEEL 304, STAINLESS STEEL 316, STAINLESS STEEL 304L, or STAINLESS STEEL 316L.

5. The hydrothermal synthesis device according to claim 1, wherein the abrasive polishing is performed by at least one method selected from mechanical polishing, chemical polishing, chemical mechanical polishing, or electropolishing.

6. The hydrothermal synthesis device according to claim 1, wherein the abrasive polishing is performed by electropolishing.

7. The hydrothermal synthesis device according to claim 6, wherein the electropolishing is performed by a process comprising:
   pre-treatment comprising acid treatment and water cleaning of an inner surface of the connection tube;
   electropolishing of the inner surface of the connection tube; and
   post-treatment comprising neutralization of an electropolishing solution and water cleaning.

8. The hydrothermal synthesis device according to claim 7, wherein the electropolishing solution comprises sulfuric acid and phosphoric acid.

9. The hydrothermal synthesis device according to claim 1, wherein an entire inner surface of the connection tube is abrasively polished.

10. The hydrothermal synthesis device according to claim 1, wherein an amount of an inorganic material in the inorganic slurry is 0.05 wt % to 5 wt %.

11. The hydrothermal synthesis device according to claim 1, wherein a hydrophobic coating is formed on an inner surface of at least one of the mixer, the reactor, and the injection tube.

12. The hydrothermal synthesis device according to claim 1, wherein the liquid stream is supercritical water heated under conditions of a temperature of 350° C. to 800° C. and a pressure of 180 bar to 550 bar.

13. The hydrothermal synthesis device according to claim 1, wherein the injection tube comprises two injection tubes positioned at outer sides of the reactor.

14. A method of preparing an inorganic slurry by using the hydrothermal synthesis device according to claim 1, the method comprising:
   injecting, into a mixer, a first precursor solution for preparation of an inorganic material via a first supply tube and a second precursor solution for preparation of an inorganic material via each of second and third supply tubes;
   introducing, into a reactor, an intermediate slurry prepared through mixing of the injected first and second precursor solutions via a connection tube;
   injecting supercritical water containing high-temperature and high-pressure water into the reactor via an injection tube;
   dissipating heat, transferred from the heated liquid stream to the connection tube, by the cooling member provided at an outer portion of the connection tube; and
   preparing an inorganic slurry by hydrothermal reaction in the reactor and continuously discharging the prepared inorganic slurry therefrom.

* * * * *